(12) United States Patent
Kim et al.

(10) Patent No.: US 12,179,592 B2
(45) Date of Patent: Dec. 31, 2024

(54) APPARATUS AND METHOD FOR CONTROLLING VEHICLE DISPLAY

(71) Applicant: Hyundai Mobis Co., Ltd., Seoul (KR)

(72) Inventors: Tae Hun Kim, Seongnam-si (KR);
Sung Joon Ahn, Seongnam-si (KR);
Seung Hwan Lee, Hwaseong-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 345 days.

(21) Appl. No.: 17/575,190

(22) Filed: Jan. 13, 2022

(65) Prior Publication Data

US 2022/0219535 A1 Jul. 14, 2022

(30) Foreign Application Priority Data

Jan. 13, 2021 (KR) ........................ 10-2021-0004941

(51) Int. Cl.
*B60K 35/00* (2024.01)
*B60W 50/08* (2020.01)
(Continued)

(52) U.S. Cl.
CPC ........... *B60K 35/00* (2013.01); *B60W 50/082* (2013.01); *B60W 50/10* (2013.01); *B60W 50/14* (2013.01);
(Continued)

(58) Field of Classification Search
CPC .............. B60K 35/00; B60K 2360/797; B60K 2360/27; B60K 35/28; B60K 2360/1868; B60K 35/80; B60K 2360/166; B60K 35/29; B60K 2360/573; B60K 2360/566; B60K 35/60; B60K 2360/782; B60W 50/082;
(Continued)

(56) References Cited

U.S. PATENT DOCUMENTS 10,146,357 B2 * 12/2018 Bendewald ........... G06F 3/0416
2016/0379422 A1 * 12/2016 Kahn ....................... B60R 1/00
701/36

(Continued)

FOREIGN PATENT DOCUMENTS

| DE | 202015104709 U1 * | 11/2015 | ............. G08G 1/144 |
| DE | 102017006941 A1 * | 3/2018 | |
| WO | WO-2015083909 A1 * | 6/2015 | ......... G01C 21/3602 |

OTHER PUBLICATIONS

English translation of DE-102017006941-A1 (Year: 2018).*
English translation of DE-202015104709-U1 (Year: 2015).*
English translation of WO-2015083909-A1 (Year: 2015).*

*Primary Examiner* — Jess Whittington
*Assistant Examiner* — Matthew Ho
(74) *Attorney, Agent, or Firm* — NSIP Law

(57) ABSTRACT

Apparatuses and a methods for controlling a part of a display of a vehicle to be transparent according to a driving situation is disclosed, where the apparatus for controlling a vehicle display includes an input configured to receive driver request information, driving road information, and steering wheel movement information and a processor configured to control a vehicle internal display to be transparent based on any one or any combination of the driver request information, the driving road information, and the steering wheel movement information, and transmit a control signal to change a portion of the vehicle internal display to be transparent.

10 Claims, 10 Drawing Sheets

(51) Int. Cl.
*B60W 50/10* (2012.01)
*B60W 50/14* (2020.01)
*B60K 35/28* (2024.01)
*B60K 35/29* (2024.01)
*B60K 35/60* (2024.01)
*B60K 35/80* (2024.01)

(52) U.S. Cl.
CPC .............. *B60K 35/28* (2024.01); *B60K 35/29* (2024.01); *B60K 35/60* (2024.01); *B60K 35/80* (2024.01); *B60K 2360/166* (2024.01); *B60K 2360/1868* (2024.01); *B60K 2360/27* (2024.01); *B60K 2360/566* (2024.01); *B60K 2360/573* (2024.01); *B60K 2360/782* (2024.01); *B60K 2360/797* (2024.01); *B60W 2050/146* (2013.01)

(58) Field of Classification Search
CPC . B60W 50/10; B60W 50/14; B60W 2050/146
See application file for complete search history.

(56) References Cited

U.S. PATENT DOCUMENTS

2017/0177957 A1* 6/2017 Yokochi .................. B60K 35/00
2018/0173237 A1* 6/2018 Reiley .................... B60Q 1/545
2022/0107497 A1* 4/2022 Murata .................. B60K 35/29

* cited by examiner

APPARATUS AND METHOD FOR CONTROLLING VEHICLE DISPLAY

CROSS-REFERENCE TO RELATED APPLICATION

This application claims the benefit under 35 USC § 119(a) of Korean Patent Application No. 10-2021-0004941, filed on Jan. 13, 2021 in the Korean Intellectual Property Office, the entire disclosure of which is incorporated herein by reference for all purposes.

BACKGROUND

1. Field

The present invention relates to an apparatus and a method for controlling a vehicle display, and more specifically, to an apparatus and a method for controlling a part of a display of a vehicle to be transparent according to a driving situation.

2. Description of Related Art

According to the conventional technology, an internal display for a vehicle passenger for checking information check and an external display for other external vehicle drivers or walkers for checking information are on a lower end of a vehicle windshield.

According to the conventional technology, there is a problem in that a driver is limited in visually checking an external situation due to the internal display while driving.

For example, when a short child passes in front of the vehicle or when a low-height obstacle is positioned in front of the vehicle and is obscured by an area of the internal display, there is a problem in that it is difficult for the driver to visually check the short child or the low-height obstacle.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect, there is provided an apparatus for controlling a vehicle display, including an input configured to receive driver request information, driving road information, and steering wheel movement information and a processor configured to control a vehicle internal display to be transparent based on any one or any combination of the driver request information, the driving road information, and the steering wheel movement information, and transmit a control signal to change a portion of the vehicle internal display to be transparent.

The input may be configured to receive the driver request information input through interaction with a mobile device.

The input may be configured to receive the driving road information from navigation map information or child protection area sign identification information, and the processor may be configured to change the portion of the vehicle internal display to be transparent, in response to a current driving road being located in the child protection area.

The processor may be configured to control application information to be displayed in a portion of the vehicle internal display that is not changed to be transparent, in response to application information set to be continuously displayed while the portion of the vehicle internal display is transparent.

The processor may be configured to control a size of the portion of the vehicle internal display that becomes transparent, and a size of the portion of the vehicle internal display in which the application information is displayed based on a movement trajectory of an external object.

The input may be configured to receive the steering wheel movement information in a driving control right transfer situation, and the processor may be configured to change the portion of the vehicle internal display to be transparent from a movement start time to a movement end time of a steering wheel.

The processor may be configured to change a driving mode to a semi-autonomous driving mode from the movement start time to the movement end time of the steering wheel and to display a guidance message related to the semi-autonomous driving mode through an external display.

According to another aspect, there is provided a processor-implemented method of controlling a vehicle display, including receiving driver request information, road information, and steering wheel movement information, and controlling a portion of a vehicle internal display to be transparent based on any one or any combination of the driver request information, the road information, and the steering wheel movement information.

The receiving of the driver request information may include receiving the driver request information input through a mobile device held on a steering wheel.

The receiving of the road information may include receiving the road information from navigation map information or child protection area sign identification information, the road information may include location of the current driving road, and the controlling of the portion of the vehicle internal display to be transparent may include changing the portion of the vehicle internal display to be transparent, in response to the current driving road being located in a child protection area.

The controlling of the portion of the vehicle internal display to be transparent may include controlling the application information to be displayed in an area, which is not changed to be transparent, of the vehicle internal display, in response to application information set to be continuously displayed while the portion of the vehicle internal display is transparent.

The controlling of the portion of the vehicle internal display to be transparent may include determining a size of the portion of the vehicle internal display that is transparent based on a movement trajectory of an external object.

The receiving of the road information may include receiving the steering wheel movement information in a driving control right transfer situation and the controlling of the portion of the vehicle internal display to be transparent may include changing the portion of the vehicle internal display to be transparent from a movement start time to a movement end time of the steering wheel, changing a driving mode to a semi-autonomous driving mode from the movement start time to the movement end time of the steering wheel, and controlling a guidance message related to a driving mode change to be displayed through an external display.

Other features and aspects will be apparent from the following detailed description, the drawings, and the claims.

BRIEF DESCRIPTION OF DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION

Figure 1:
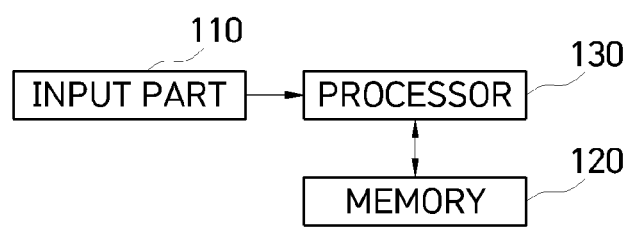
FIG. 1 is a view illustrating a vehicle display control apparatus according to an embodiment of the present invention.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Also, in the description of the components, terms such as first, second, A, B, (a), (b) or the like may be used herein when describing components of the present disclosure. These terms are used only for the purpose of discriminating one constituent element from another constituent element, and the nature, the sequences, or the orders of the constituent elements are not limited by the terms. When one constituent element is described as being "connected", "coupled", or "attached" to another constituent element, it should be understood that one constituent element can be connected or attached directly to another constituent element, and an intervening constituent element can also be "connected", "coupled", or "attached" to the constituent elements.

FIG. 1 is a view illustrating a vehicle display control apparatus according to an embodiment of the present invention.

The vehicle display control apparatus according to the embodiment of the present invention includes an input part 110 (which may also be referred to as "input" 110) which receives driver request information, driving road information, and steering wheel movement information, a memory 120 for storing a program which controls a vehicle internal display to be transparent using at least one of the driver request information, the driving road information, and the steering wheel movement information, and a processor 130 which executes the program, and when the processor 130 determines that a situation needs the vehicle internal display to be transparent using at least any one of the driver request information, the driving road, and the steering wheel movement information, the processor 130 transmits a control signal to change at least a part of an area of the vehicle internal display to be transparent.

The input part 110 receives the driver request information input through a mobile device, and the processor 130 changes at least a part of the area of the vehicle internal display to be transparent.

The input part 110 receives the driving road information from navigation map information or child protection area sign identification information, and when a current driving road is located in a child protection area, the processor 130 changes at least a part of the area of the vehicle internal display to be transparent.

When there is application information set to be continuously displayed while the vehicle internal display is transparent, the processor 130 controls the application information to be displayed in an area in which the vehicle internal display is not changed to be transparent.

The processor 130 controls an area, which becomes transparent, and an area, in which the application information is displayed, to be changed in the vehicle internal display.

In a driving control right transfer situation, the input part 110 receives the steering wheel movement information, and the processor 130 changes at least a part of the area of the vehicle internal display to be transparent from a movement start time to a movement end time of the steering wheel.

The processor 130 controls a driving mode to be changed to a semi-autonomous driving mode and a guidance message related to the semi-autonomous driving mode to be displayed through an external display from the movement start time to the movement end time of the steering wheel.

Figure 2A:
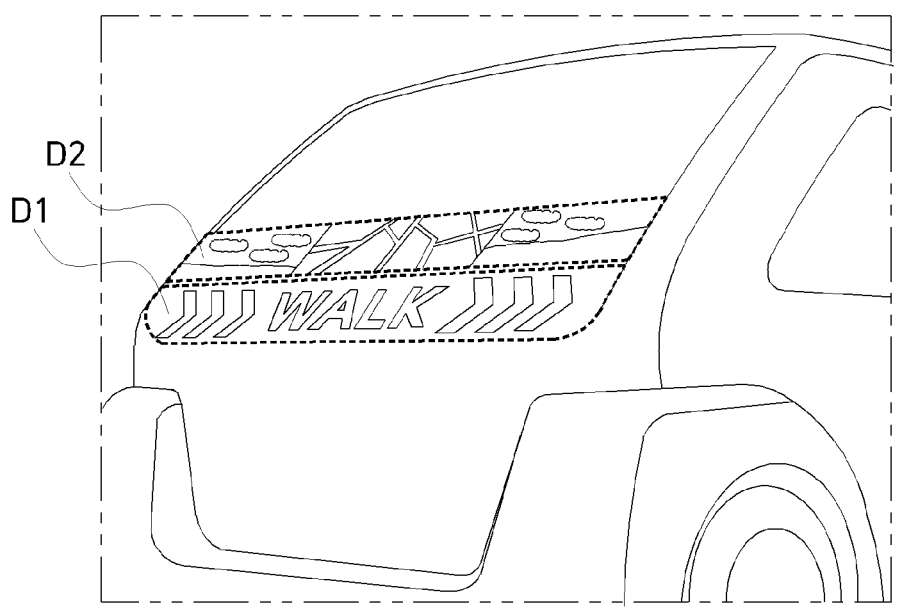
FIGS. 2A to 2C are views illustrating internal and external displays according to an embodiment of the present invention.
Figure 2B:
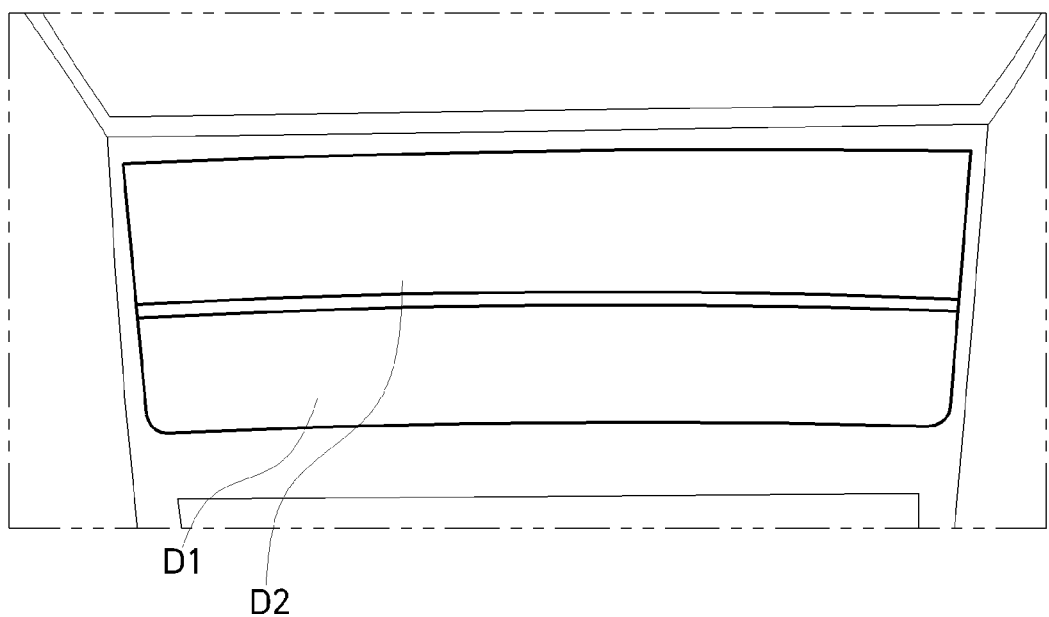
Figure 2C:
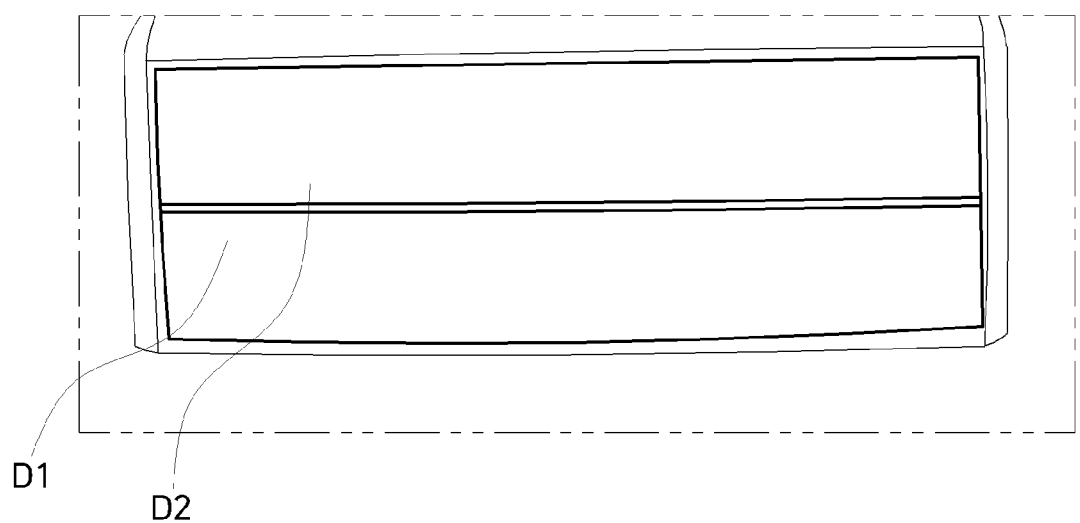

FIGS. 2A to 2C are views illustrating internal and external displays according to an embodiment of the present invention.

Referring to FIG. 2A, an internal display D1 and an external display D2 are disposed on a lower end of a windshield.

Transparency of each of the internal display D1 and the external display D2 may be adjusted by an electrochromism film, and image information is displayed on each of the internal display D1 and the external display D2 by a projector.

FIG. 2B is a view illustrating the internal display D1 and the external display D2 when viewed from the inside of the vehicle.

The internal display D1 includes a cluster area and an application area to display information of content and the like of the mobile device linked thereto by a driver or passenger as well as driving information.

In the external display D2, various messages may be displayed, for example, a welcome message may be displayed to the driver positioned at the outside before driving starts, a message may be displayed to a walker to indicate that crossing is okay while driving, and a message related to a driving direction of the own vehicle may be displayed to other vehicle drivers while driving.

Referring to FIG. 2C, the internal display D1 is in a transparent state, and the external display D2 is in an opaque state.

As described above, transparency adjustment may be made by controlling the electrochromism film.

Figure 3:
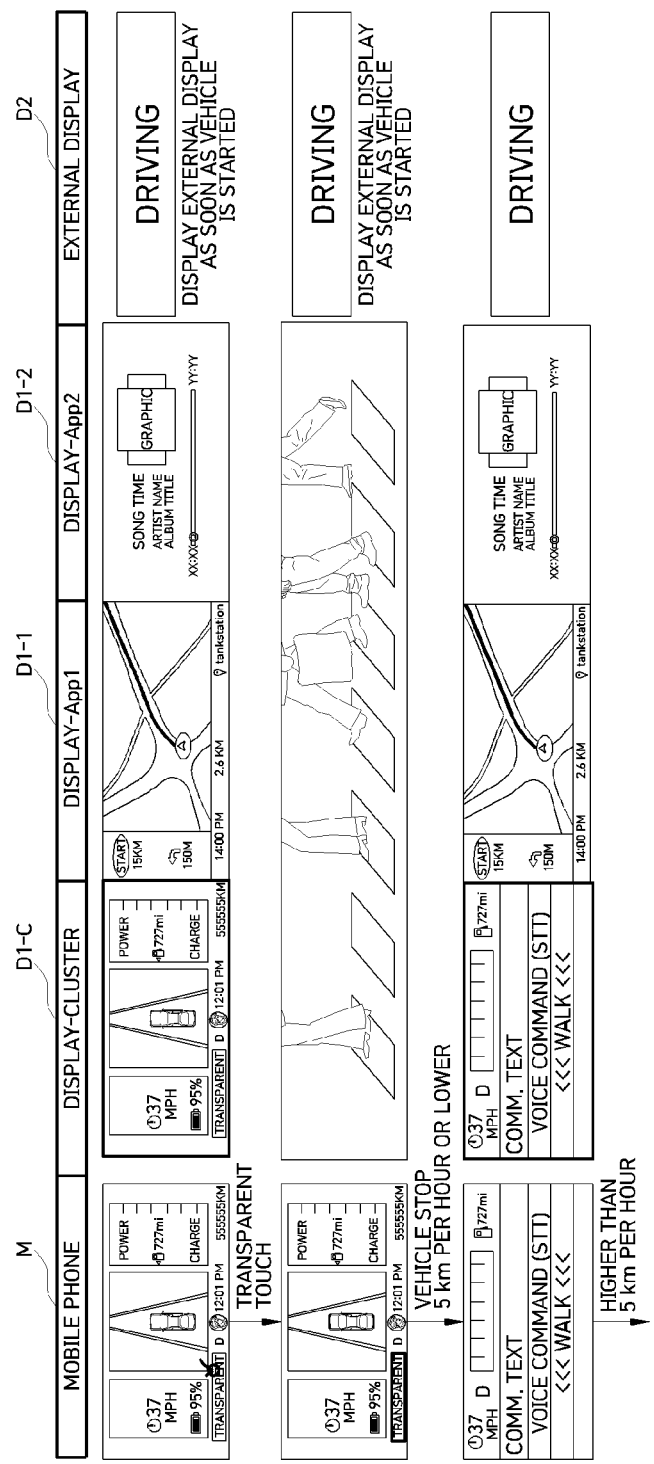
FIG. 3 is a view illustrating a process in which an internal display becomes transparent according to a button input according to an embodiment of the present invention.
Figure 4:
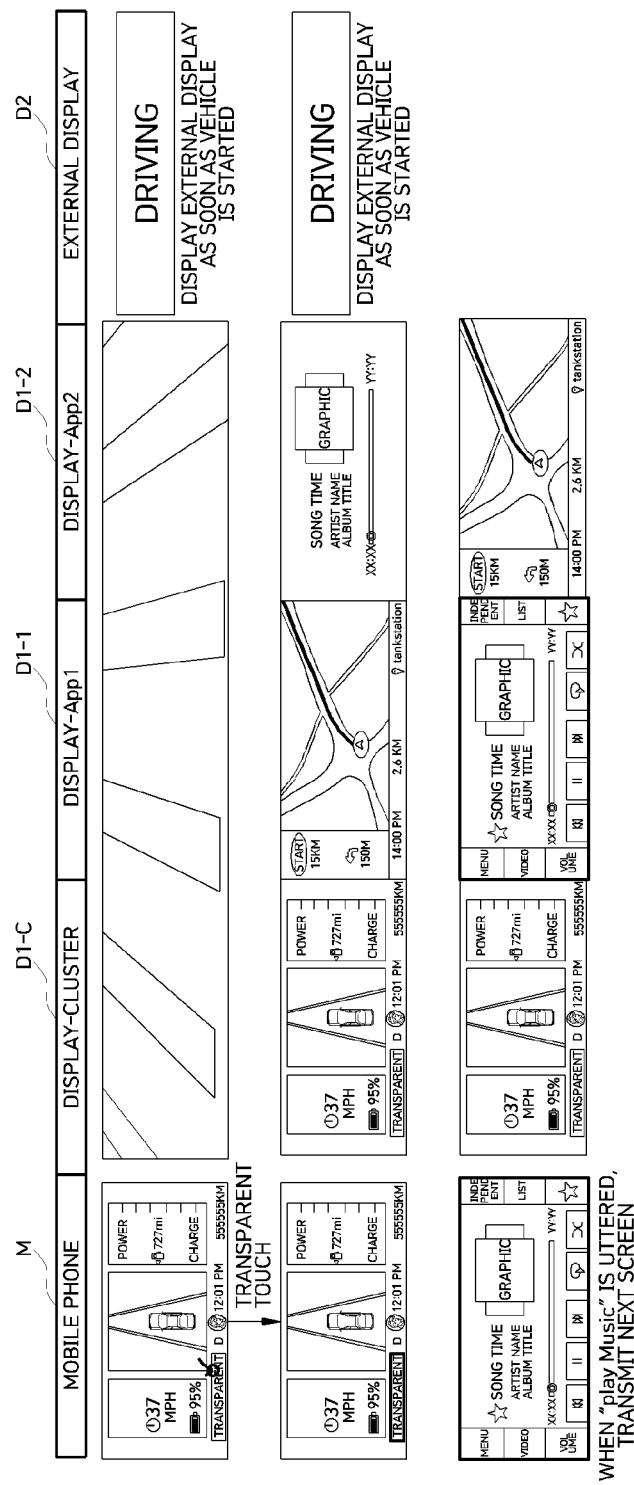
FIG. 4 is a view illustrating a process in which a transparent state of an internal display is released according to a button input according to an embodiment of the present invention button input.

FIG. 3 is a view illustrating a process in which an internal display becomes transparent according to a button input according to an embodiment of the present invention, and FIG. 4 is a view illustrating a process in which a transparent state of an internal display is released according to a button input according to an embodiment of the present invention button input.

Referring to FIG. 3, a cluster area D1-C of the internal display is focused by a mobile device M, and in the application area, navigation information is displayed in a first area D1-1, music application information is displayed in the second area D1-2, and a message of "Driving" is displayed on the external display D2 as soon as a vehicle is started.

The mobile device M may be held in the steering wheel.

In the mobile device M, when a predetermined button (for example, a "transparent" button) is touched, the internal display including the areas D1-C, D1-1, and D1-2 is changed to be transparent so that the driver may visually check the outside of the vehicle through the internal display area.

In this case, when a driving speed of the vehicle is less than or equal to a predetermined speed (for example, 5 km per hour) or when the vehicle stops, the mobile device M may display a screen on which a walker guidance message may be selected, and the guidance message may be displayed through the external display D2 according to guidance message selection (which may be performed by voice, touch, or the like).

Referring to FIGS. 3 and 4, when the "transparent" button is touched on the mobile device M, the internal display including the areas D1-C, D1-1, and D1-2 is changed to be transparent, and when the vehicle stops or when the speed is less than or equal to the predetermined speed, the transparency of the internal display including the areas D1-C, D1-1, and D1-2 is released. When the vehicle starts driving again and when the speed is greater than the predetermined speed, the internal display including the areas D1-C, D1-1, and D1-2 becomes transparent, and when the "transparent" button is touched on the mobile device M, the transparency of the internal display including the areas D1-C, D1-1, and D1-2 is released.

That is, when the transparent state is released, the internal display including the areas D1-C, D1-1, and D1-2 displays information through the cluster area D1-C and the application area D1-1 and D1-2.

As another example, the internal display may also be maintained in the transparent state from a time point at which the vehicle stops or the speed is less than or equal to the predetermined speed to a time point at which the vehicle starts driving again and the speed is greater than the predetermined speed.

Referring to FIG. 4, when the driver says "play music," music application information is displayed on the mobile device M and the first area D1-1, the navigation information, which has been displayed in the first area D1-1, is moved to and displayed in the second area D1-2.

Figure 5:
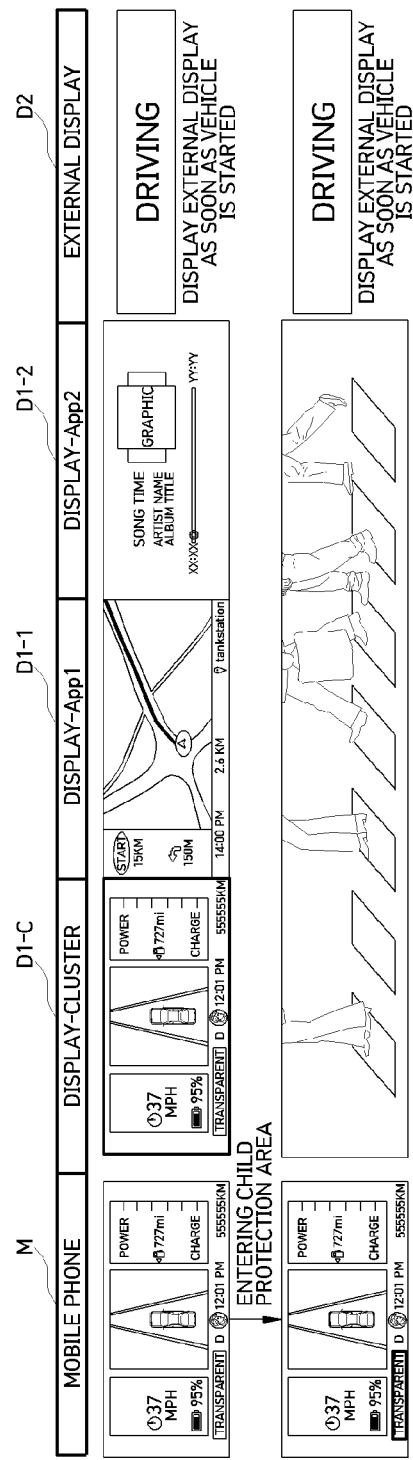
FIG. 5 is a view illustrating a process in which an internal display becomes transparent using road information according to an embodiment of the present invention.

FIG. 5 is a view illustrating a process in which an internal display becomes transparent using road information according to an embodiment of the present invention.

When it is recognized that the driving vehicle enters the child protection area through the navigation map information, a child protection area sign identification result, or the like, the internal display including the areas D1-C, D1-1, and D1-2 becomes transparent, and the driver may visually check the outside through the internal display area, which is disposed on the lower end of the windshield, like the windshield.

According to the embodiment of the present, when the driving vehicle enters the child protection area, the internal display is automatically changed to be transparent.

As another example, when parked/stopped vehicles are sequentially present at a rightmost lane, since it may be difficult to recognize a walker who suddenly rushes out from between the parked/stopped vehicles (particularly, in the case of a short young child, since the short young child is obscured by the internal display area, it may be difficult for the driver to visually recognize the short young child), the internal display may also be automatically changed to be transparent.

Figure 6:
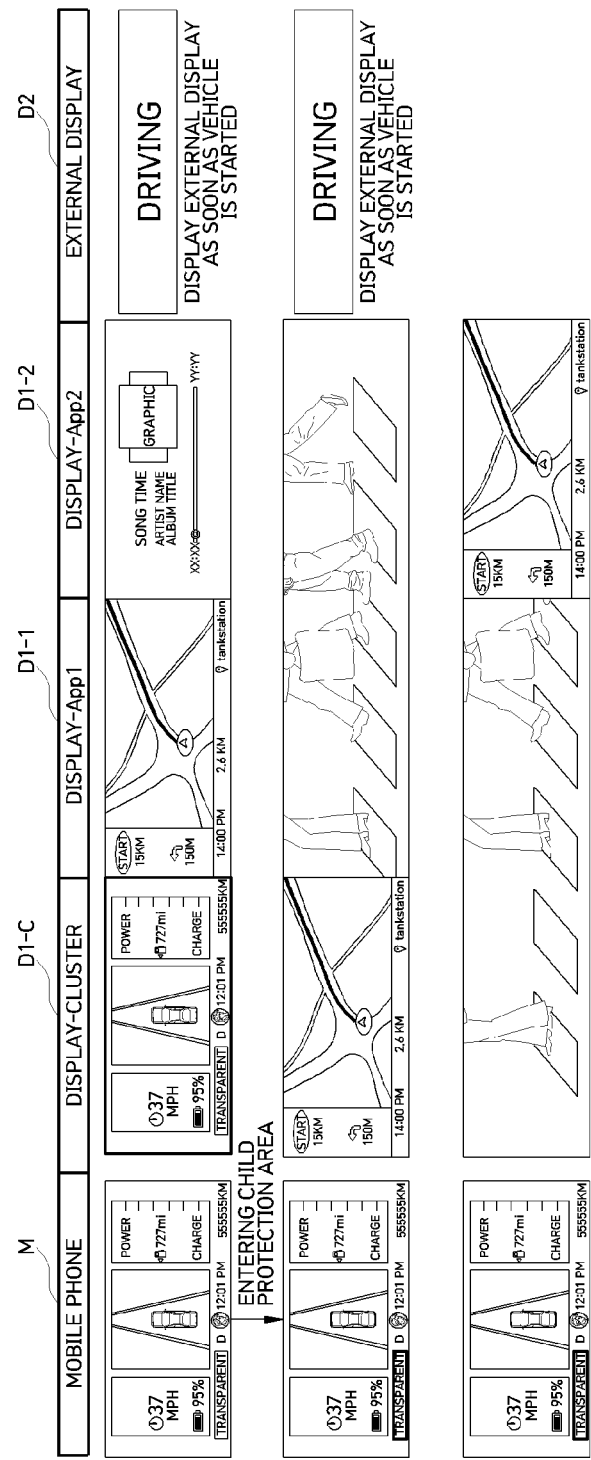
FIG. 6 is a view illustrating a process in which an internal display becomes partially transparent according to an embodiment of the present invention.

FIG. 6 is a view illustrating a process in which an internal display becomes partially transparent according to an embodiment of the present invention.

When the vehicle enters the child protection area or when the "transparent" button is pressed on the mobile device M, in the internal display area, information such as the navigation information, which needs to be continuously checked, is maintained, and the remaining area of the internal display is changed to be transparent.

Referring to FIG. 6, conventionally, cluster information is displayed in a cluster area D1-C, navigation information is displayed in a first area D1-1, and music application information is displayed in a second area D1-2.

When the vehicle enters the child protection area or when the "transparent" button is pressed on the mobile device M, the navigation information is temporarily moved to and displayed on the cluster area D1-C, and the first area D1-1 and the second area D1-2 are changed to be transparent so that the driver may visually check the outside.

In this case, it is illustrated that an area, in which the navigation information is displayed, is changed and a display form of the navigation information is not changed, but as another example, the navigation information is changed as an abbreviated icon (for example, map information thereof is not displayed temporarily, driving guide information, that is, for example, only navigation information of "turn left at 300 m ahead" is changed and displayed as the abbreviated icon), and a size of a display area is relatively decreased when compared to the conventional display form so that an area, through which the driver may visually check, may be secured to be as large as possible.

As illustrated in FIG. 6, the area, in which the navigation information may be displayed, may be not only the cluster area D1-C but also the second area D1-2.

The display area may be changed according to a result of checking a direction, in which a walker is approaching, and a movement trajectory of the walker using an external object recognition module such as a camera, a radar, or a LiDAR.

For example, when one child walker crosses from left to right in front of the vehicle, a position of the navigation information, which has been displayed on the cluster area D1-C, may be changed to the second area D1-2, and the navigation information may be displayed on the second area D1-2 according to the movement trajectory of the child walker so that the drive may easily, continuously, and visually check the corresponding child walker.

Figure 7:
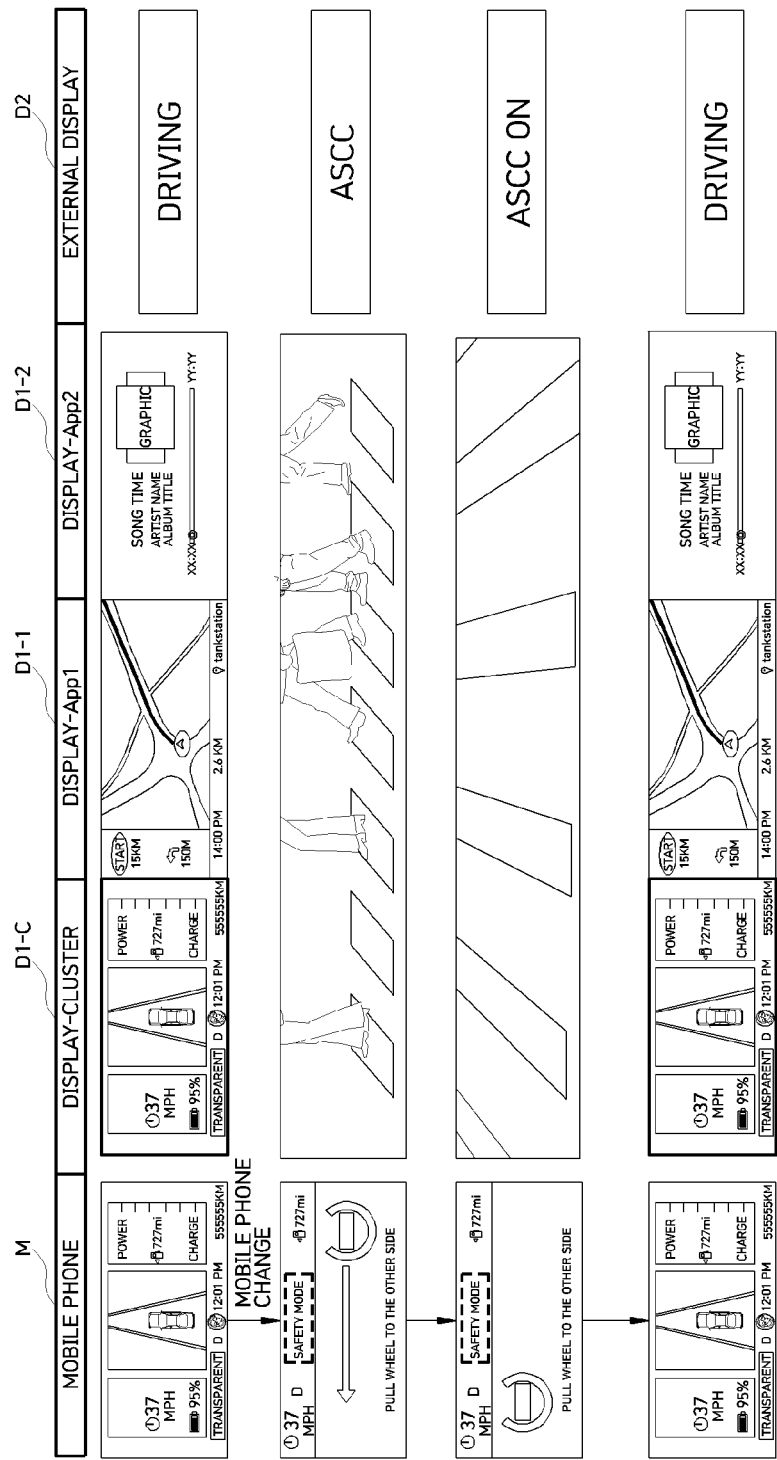
FIG. 7 is a view illustrating a process in which an internal display becomes transparent when a steering wheel moves according to an embodiment of the present invention.

FIG. 7 is a view illustrating a process in which an internal display becomes transparent when a steering wheel moves according to an embodiment of the present invention In a state in which the steering wheel is moved from a side of a driver seat to a side of a passenger seat so that a driving control right is transferred from the driver to the passenger, the internal display including the areas D1-C, D1-1, and D1-2 becomes transparent so that the front is easily checked.

When the steering wheel is moved, a semi-autonomous driving mode is started as the driving mode of the vehicle, the driving speed decreases, the internal display including the areas D1-C, D1-1, and D1-2 becomes transparent, and a message indicating that the mode of the driving vehicle is the semi-autonomous driving mode is displayed through the external display D2.

When the movement of the steering wheel is completed, the transparency of the internal display including the areas D1-C, D1-1, and D1-2 is released, and information is displayed in the cluster area D1-C and the application area D1-1 and D1-2 as in the conventional case.

Figure 8:
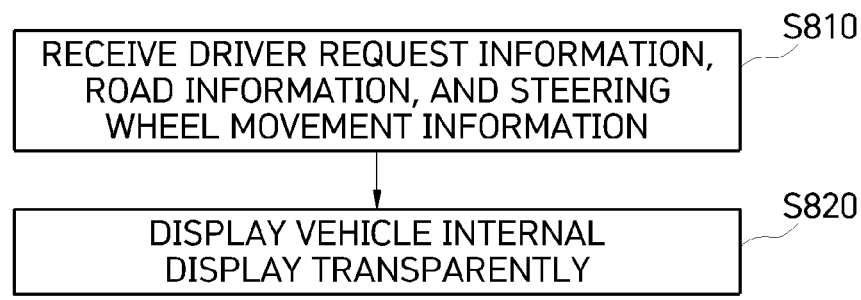
FIG. 8 is a view illustrating a method of controlling a vehicle display according to an embodiment of the present invention.

FIG. 8 is a view illustrating a method of controlling a vehicle display according to an embodiment of the present invention.

The method of controlling the vehicle display according to the embodiment of the present invention includes an operation of receiving driver request information, road information, and steering wheel movement information (S810) and an operation of controlling at least a part of the area of the vehicle internal display to be transparent using at least any one of the driver request information, the road information, and the steering wheel movement information (S820).

In operation S810, the driver request information input through the mobile device held on the steering wheel is received.

In operation S810, the road information is received from the navigation map information or the child protection area sign identification information, and in operation S820, when the current driving road is located in the child protection area, at least a part of the area of the vehicle internal display is changed to be transparent.

In operation S820, when there is application information set to be continuously displayed, the application information is controlled to be displayed in an area, which is not changed to be transparent, of the vehicle internal display.

In operation S820, an area of the vehicle internal display to be transparent is determined in consideration of a movement trajectory of an external object.

In operation S810, in a driving control right transfer situation, steering wheel movement information is received, and in S820, at least a part of the area of the vehicle internal display is changed to be transparent from a movement start time to a movement end time of the steering wheel, and a guidance message related to a change in driving mode is displayed through the external display.

According to the embodiment of the present invention, in a vehicle sharing situation, the internal and external displays of the vehicle may become transparent at a predetermined time point prior to returning the vehicle or during a predetermined time period after returning the vehicle so as to provide support so that it is easy to check whether there is an object left in the vehicle.

According to the embodiment of the present invention, in order to protect privacy of the vehicle passenger, transparency of the internal and external display area may be adjusted in addition to the windshield (for example, the outside is seen from an interior, but the interior is not seen from the outside).

Meanwhile, the method of controlling the vehicle display according to the embodiment of the present invention may be implemented in a computer system or recorded on a storage medium. The computer system may include one or more processors, a memory, a user input device, a data communication bus, a user output device, and a storage. Data communication is performed between the above-described components through the data communication bus.

As described above, the present disclosure is directed to providing an apparatus and a method which support a driver to easily visually check an external situation by controlling a part of a vehicle display to be transparent according to a driving situation.

The apparatuses, parts, devices, units, modules, and components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an application-specific integrated circuit (ASIC), a field programmable gate array (FPGA), a programmable logic unit (PLU), a central processing unit (CPU), a graphics processing unit (GPU), a neural processing unit (NPU), or any other device capable of responding to and executing instructions in a defined manner.

The methods that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), magnetic RAM (MRAM), spin-transfer torque (STT)-MRAM, static random-access memory (SRAM), thyristor RAM (T-RAM), zero capacitor RAM (Z-RAM), twin transistor RAM (TTRAM), conductive bridging RAM (CBRAM), ferroelectric RAM (FeRAM), phase change RAM (PRAM), resistive RAM (RRAM), nanotube RRAM, polymer RAM (PoRAM), nano floating gate Memory (NFGM), holographic memory, molecular electronic memory device), insulator resistance change memory, dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In an example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An apparatus for controlling a vehicle display, comprising:
 a memory configured to store a program, wherein the program, when executed by a processor, controls at least a portion of a vehicle internal display to be transparent based on at least one of driver request information, driving road information, and steering wheel movement information; and the processor configured to execute the program stored in the memory, wherein:

the memory is further configured to receive the driving road information from navigation map or a sign identifying an area, and to receive the steering wheel movement information in a driving control right transfer situation, and the processor is further configured to change the portion of the vehicle internal display to be transparent, in response to a current driving road being located area, and to change the portion of the vehicle internal display to be transparent from a movement start time to a movement end time of a steering wheel.

2. The apparatus of claim 1, wherein:

the memory is configured to receive the driver request information input from a mobile device.

3. The apparatus of claim 1, wherein the processor is further configured to display application information which is set to be continuously displayed in a portion of the vehicle internal display that is not transparent.

4. The apparatus of claim 3, wherein the processor is further configured to control a size of the portion of the vehicle internal display that is transparent, and a size of the portion of the vehicle internal display in which the application information is displayed based on a movement trajectory of an external object.

5. The apparatus of claim 1, wherein the processor is further configured to change a driving mode to a semi-autonomous driving mode from the movement start time to the movement end time of the steering wheel and to display a guidance message related to the semi-autonomous driving mode through an external display.

6. A processor-implemented method of controlling a vehicle display, comprising:

receiving driver request information, road information, and steering wheel movement information in a driving control right transfer situation; and controlling a portion of a vehicle internal display to be transparent based on any one or any combination of the driver request information, the road information, and the steering wheel movement information, wherein the portion of the vehicle display is made to be transparent from a movement start time to a movement end time of a steering wheel;

the receiving of the road information comprises receiving the road information from navigation map information or a sign indicating a designated area;

the road information comprises a location of the current driving road; and controlling the portion of the vehicle internal display to be transparent comprises changing the portion of the vehicle internal display to be transparent, in response to the current driving road being located in the designated area.

7. The method of claim 6, wherein the receiving of the driver request information comprises receiving the driver request information input through a mobile device.

8. The method of claim 6, wherein controlling the portion of the vehicle internal display to be transparent comprises controlling the application information to be displayed in an area, which is not changed to be transparent, of the vehicle internal display, in response to application information set to be continuously displayed while the portion of the vehicle internal display is transparent.

9. The method of claim 8, wherein controlling the portion of the vehicle internal display to be transparent comprises determining a size of the portion of the vehicle internal display that is transparent based on a movement trajectory of an external object.

10. The method of claim 6, wherein:

receiving the road information comprises receiving the steering wheel movement information in a driving control right transfer situation; and controlling the portion of the vehicle internal display to be transparent comprises changing the portion of the vehicle internal display to be transparent from a movement start time to a movement end time of the steering wheel, changing a driving mode to a semi-autonomous driving mode from the movement start time to the movement end time of the steering wheel, and controlling a guidance message related to the driving mode change to be displayed through an external display.

* * * * *